March 3, 1931.  O. E. JORGENSEN  1,795,088
INTERNAL COMBUSTION ENGINE
Filed Dec. 7, 1927   9 Sheets-Sheet 1

Inventor
Olav E. Jorgensen
By his Attorneys
Ward Crosby & Smith

March 3, 1931. O. E. JORGENSEN 1,795,088
INTERNAL COMBUSTION ENGINE
Filed Dec. 7, 1927 9 Sheets-Sheet 3

Inventor
Olav E. Jorgensen
By his Attorneys
Ward Crosby & Smith

March 3, 1931. O. E. JORGENSEN 1,795,088
INTERNAL COMBUSTION ENGINE
Filed Dec. 7, 1927 9 Sheets-Sheet 4

March 3, 1931.     O. E. JORGENSEN     1,795,088
INTERNAL COMBUSTION ENGINE
Filed Dec. 7, 1927     9 Sheets-Sheet 6

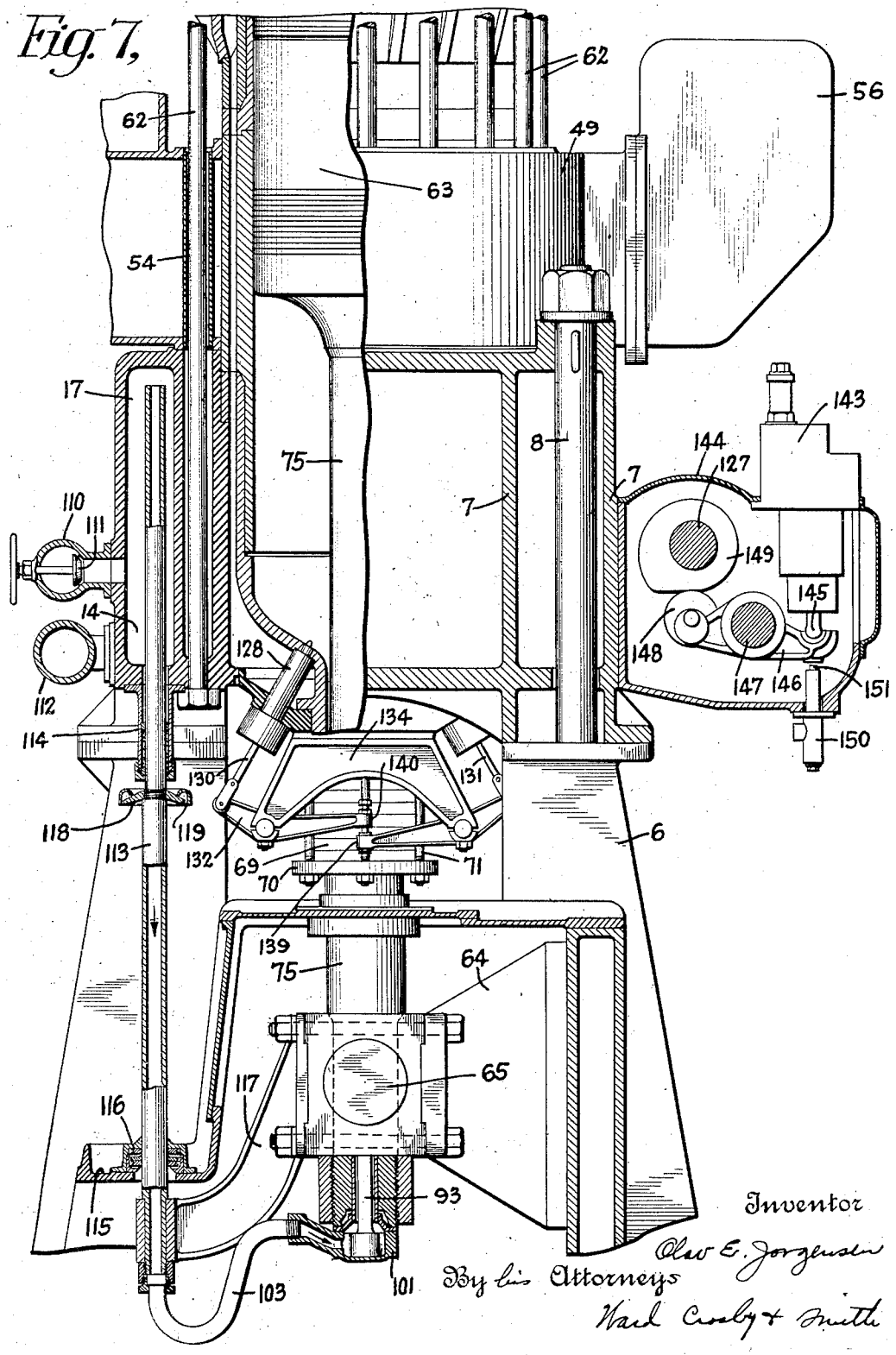

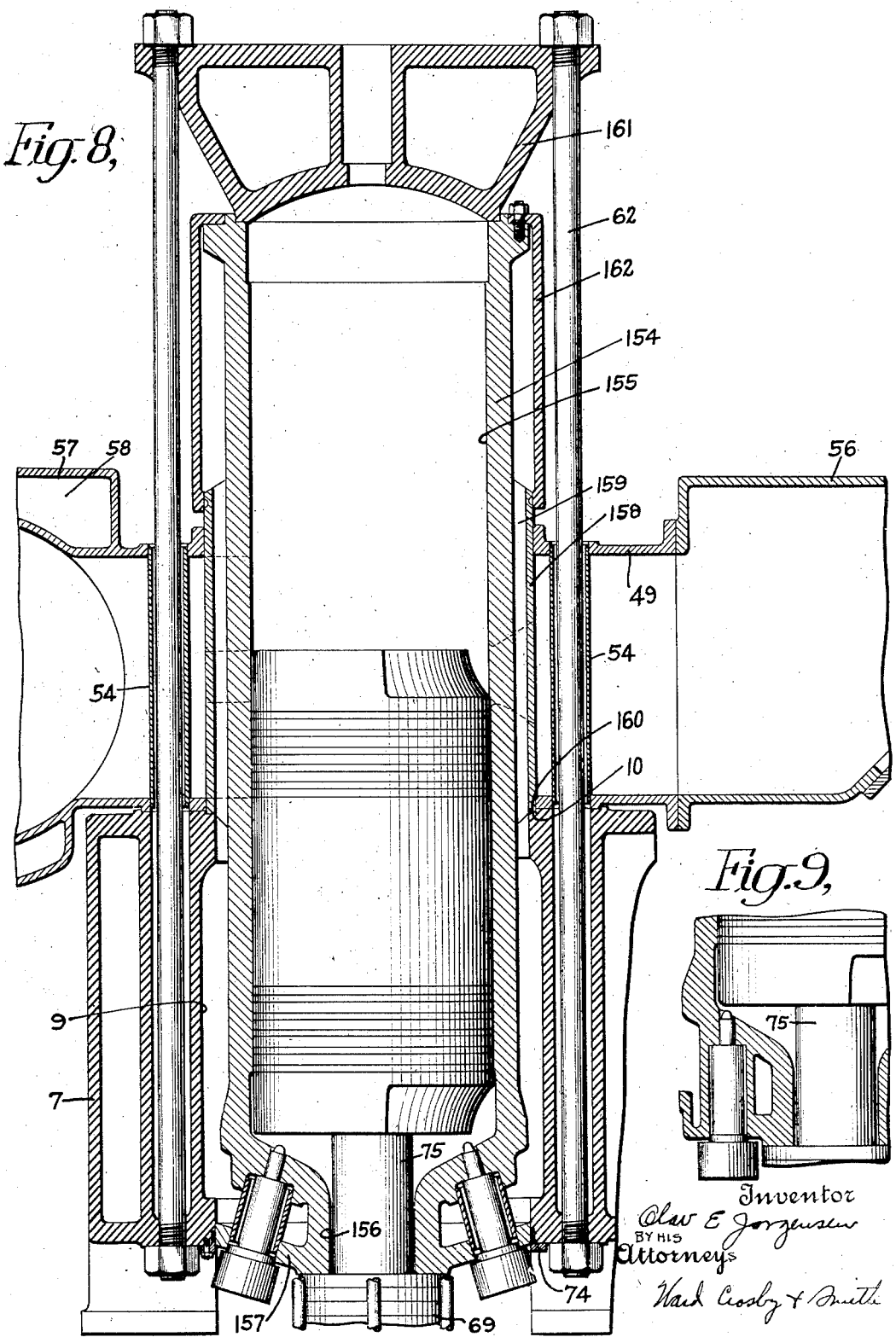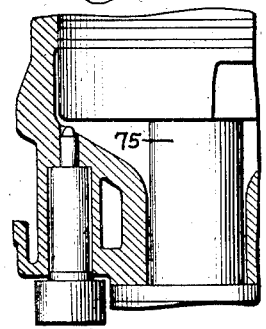

March 3, 1931. O. E. JORGENSEN 1,795,088
INTERNAL COMBUSTION ENGINE
Filed Dec. 7, 1927 9 Sheets-Sheet 9
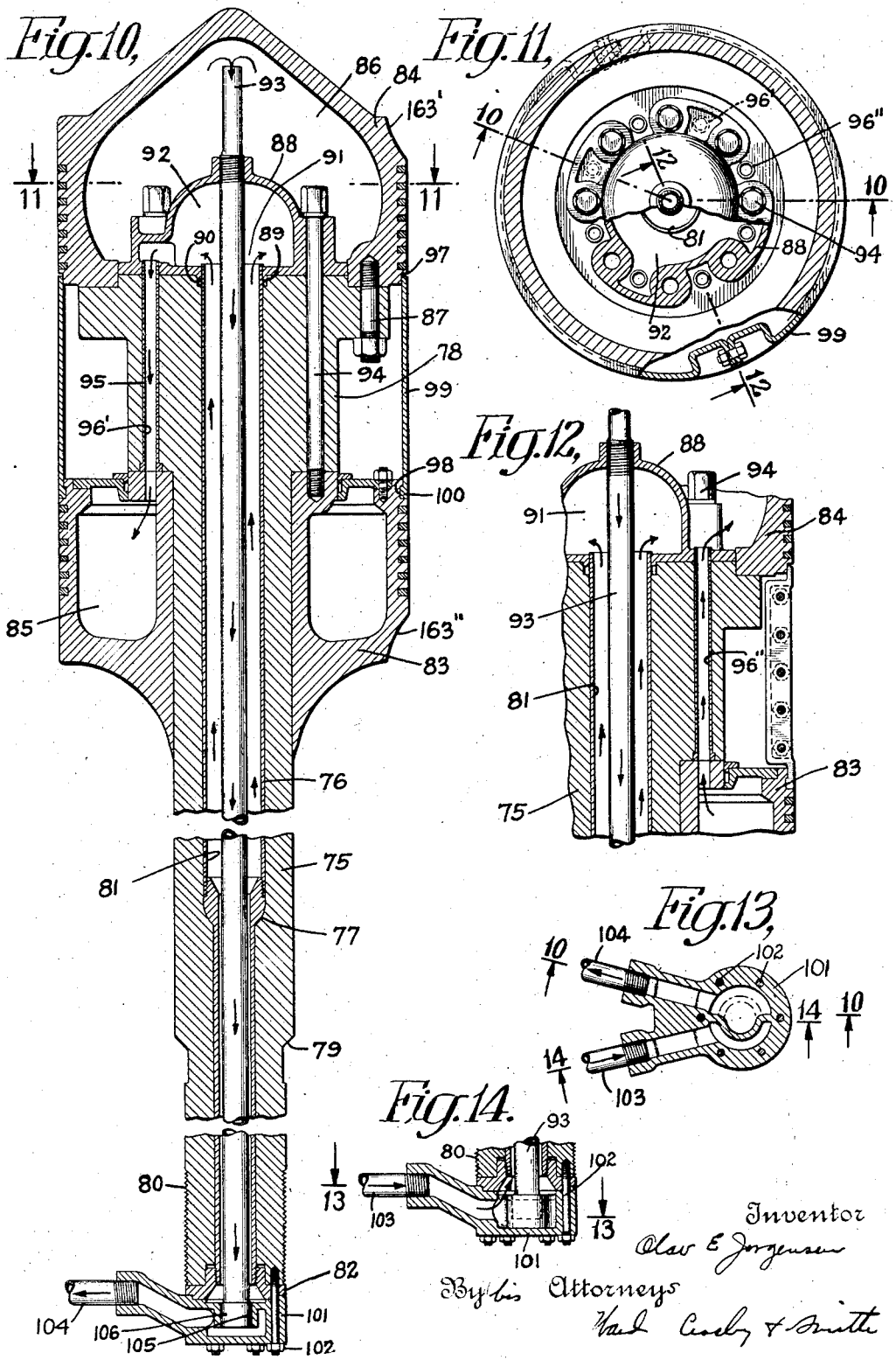
Inventor
Olav E Jorgensen
By his Attorneys Patented Mar. 3, 1931

1,795,088

UNITED STATES PATENT OFFICE

OLAV E. JORGENSEN, OF FOREST HILLS, NEW YORK

INTERNAL-COMBUSTION ENGINE

Application filed December 7, 1927. Serial No. 238,382.

This invention relates to internal combustion engines, and more particularly to Diesel or oil burning engines; and the invention is herein more specifically embodied in a double acting two stroke cycle Diesel engine, by way of illustration merely, and as showing its application to what is now considered its most useful field.

In engines of large size, particularly of the Diesel type, which attain sizes developing several thousand horse power each, it is extremely important to provide a stress carrying framework capable of adequately taking care of the tremendous stresses resulting from the power stroke and for transmitting these enormous reciprocal forces to rotary motion of the crank shaft. At the same time, it is of great importance to maintain the gross weight at a minimum for purposes of economy in building and in weight per horse power. Another matter of great importance in such engines is the matter of assembly and servicing; and hence it is desirable to provide an engine of as few and simple parts as possible and one which may be easily serviced. Since the power cylinders and pistons are subjected to the greatest thermal and dynamic stresses, their ready examination is desirable. Also it is very objectionable to have members other than the pistons and cylinders subjected to substantial dynamic stresses and also subjected to substantial thermal stresses and vice versa.

In addition to the foregoing, the cooling gear for the power pistons has been a source of great trouble and annoyance.

With these and other problems in view, the invention consists in an engine of improved design, comprising the novel features, arrangement, construction and combination of parts, more specifically adapted for double acting two stroke cycle engines of the Diesel type and particularly suitable for heavy duty, such for example as marine duty; and the purpose of the invention is to provide an improved engine embodying the requirements and free from the objections hereinbefore set forth.

Figure 1:
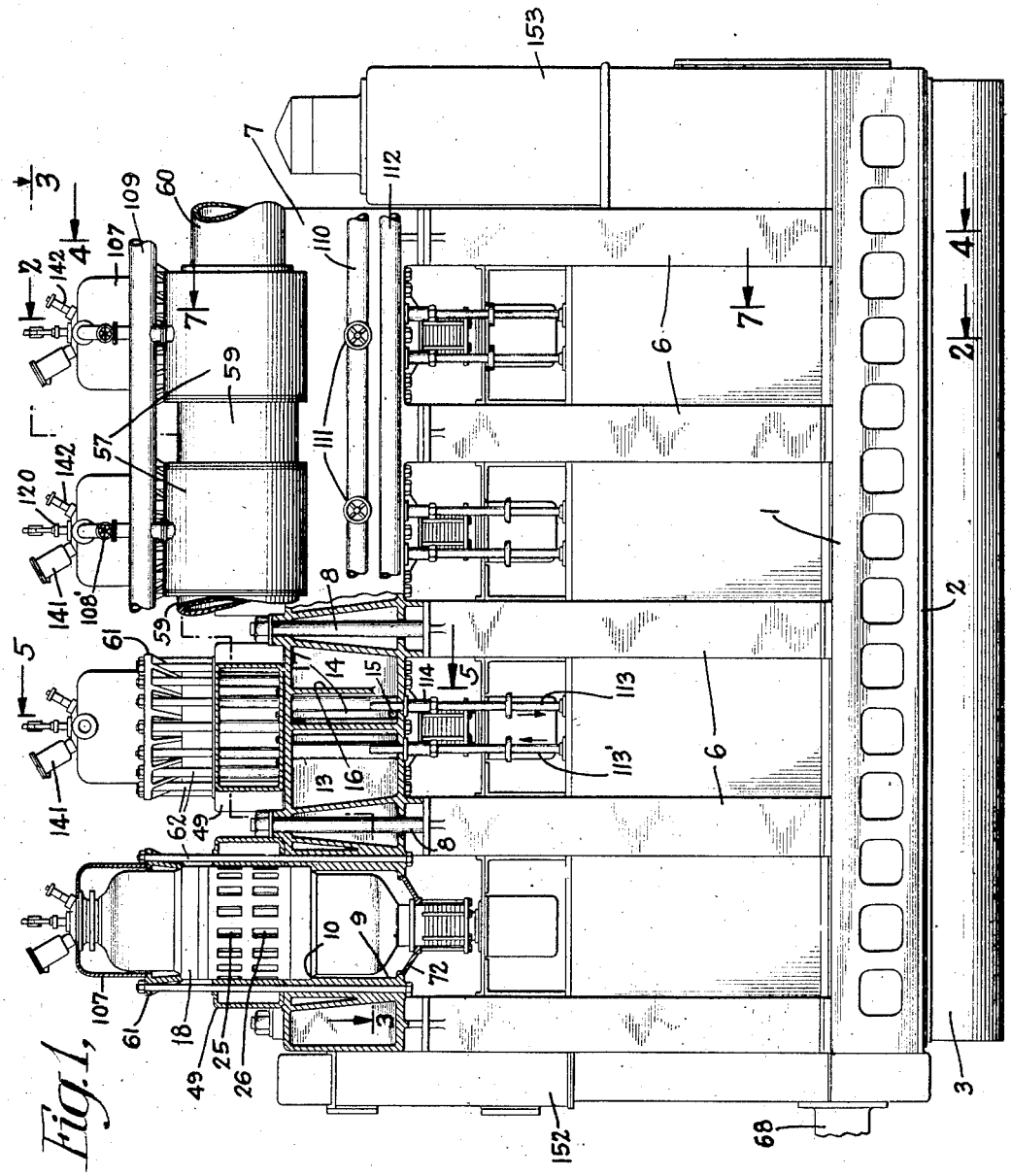
Figure 2:
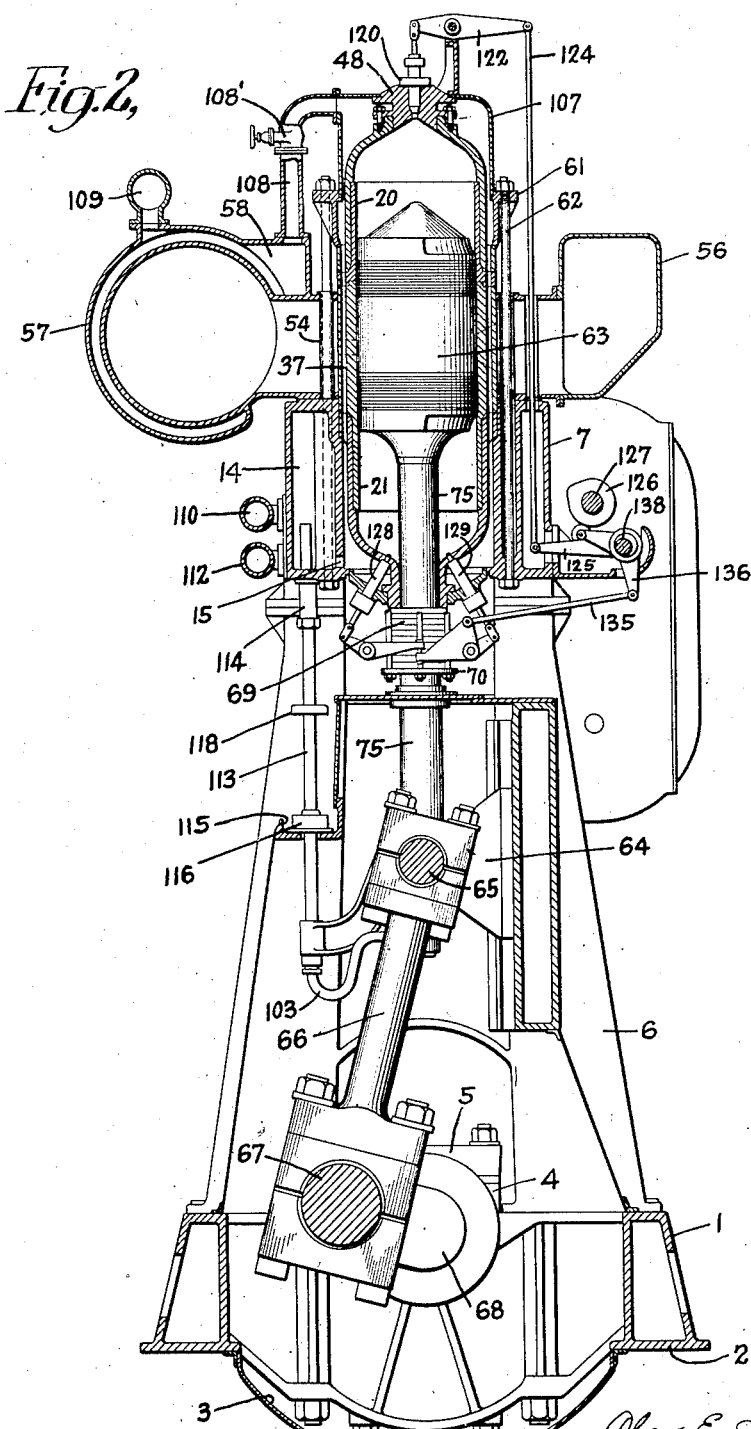
Figure 3:
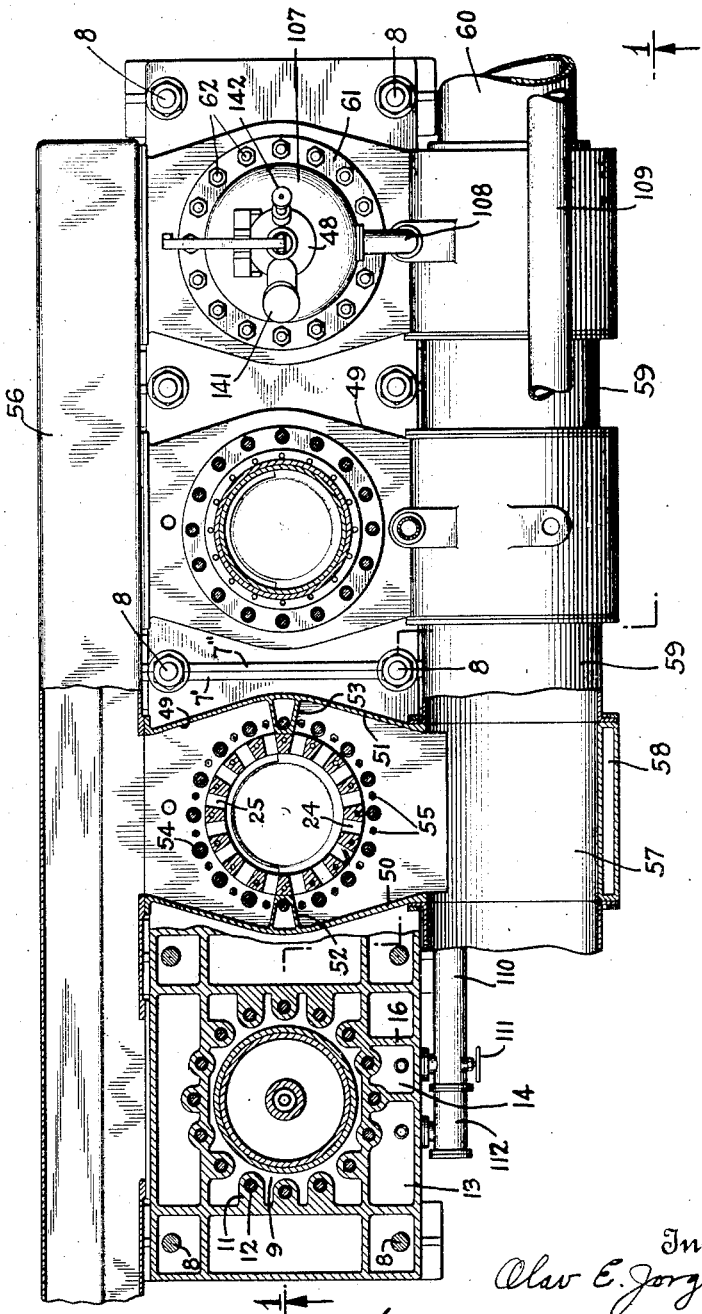
Figure 4:
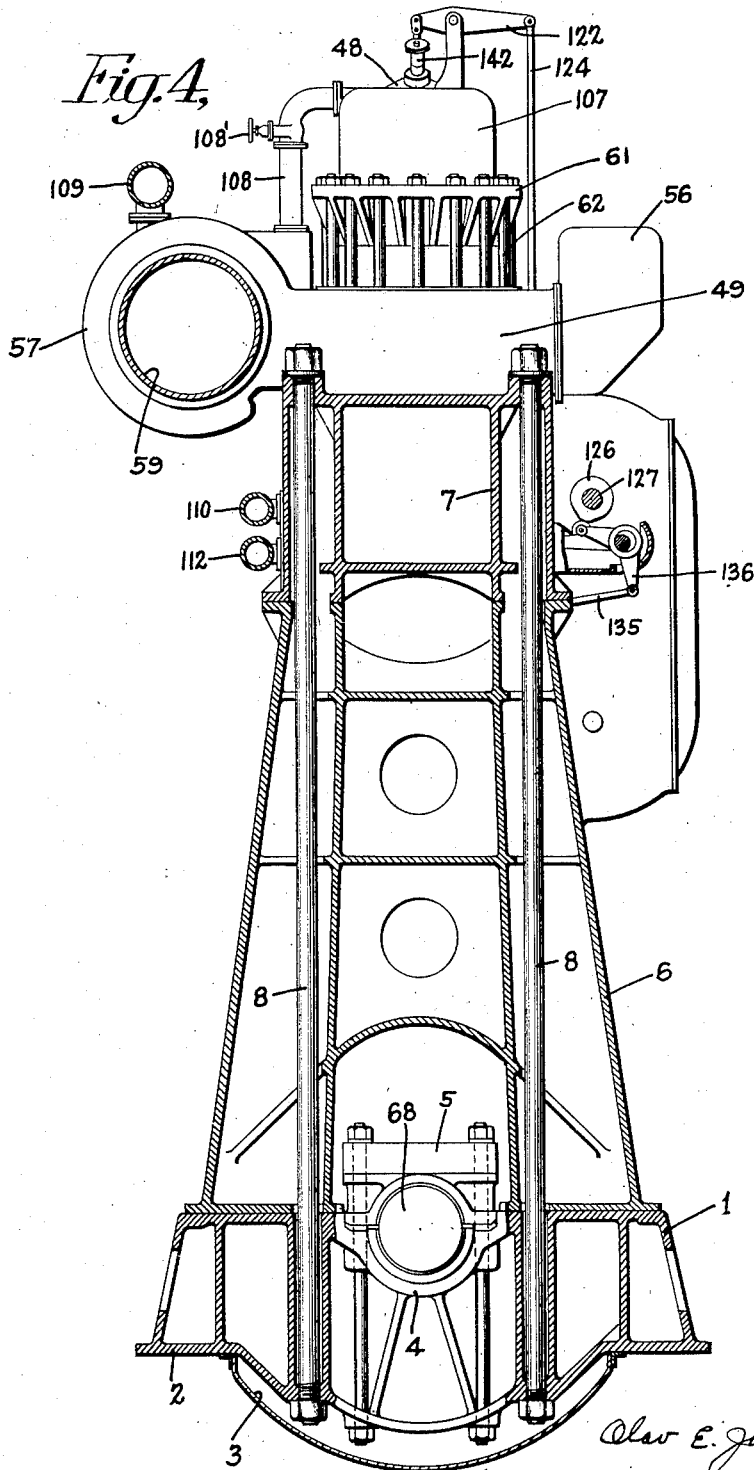
Figure 5:
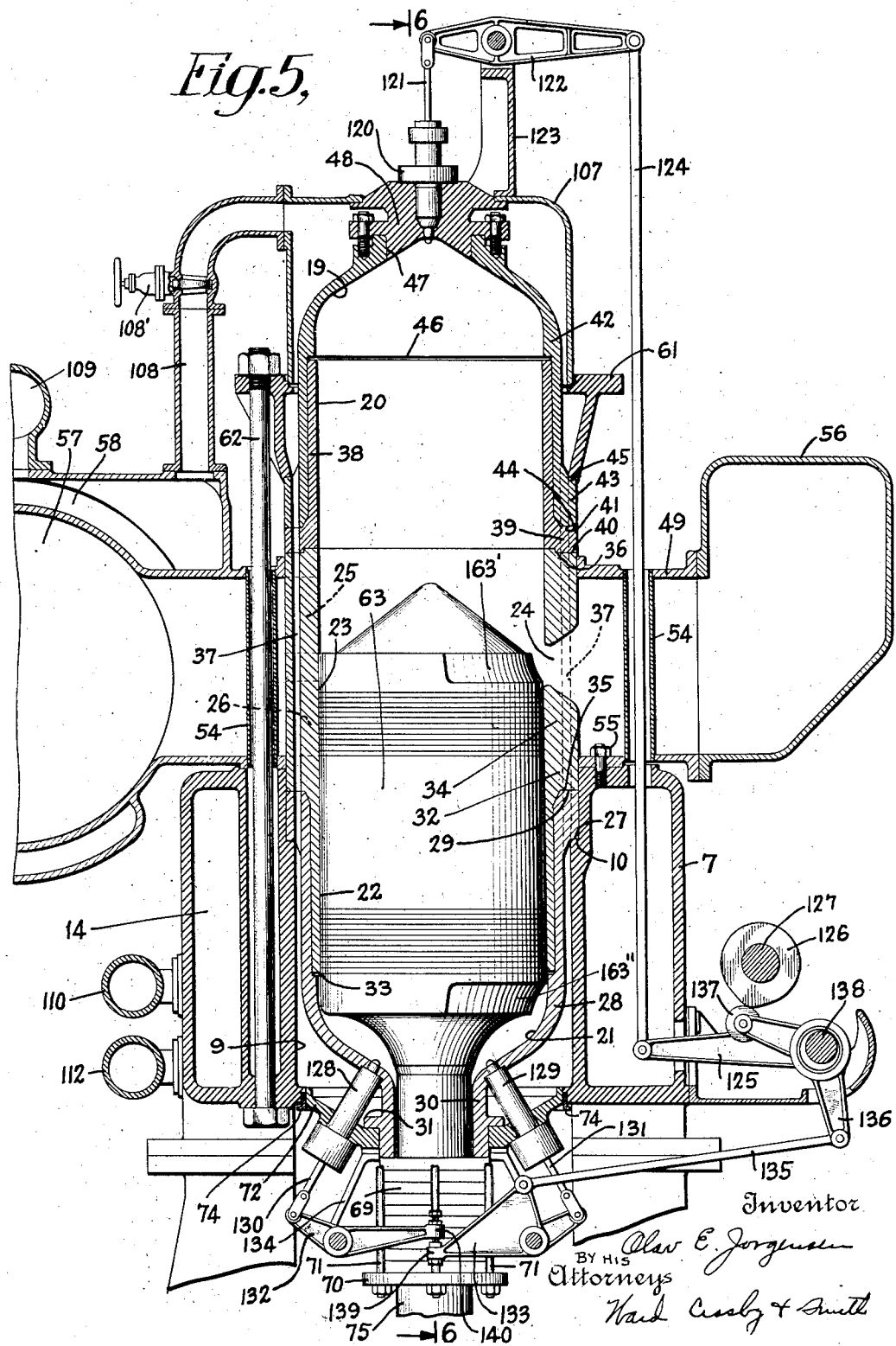
Figure 6:
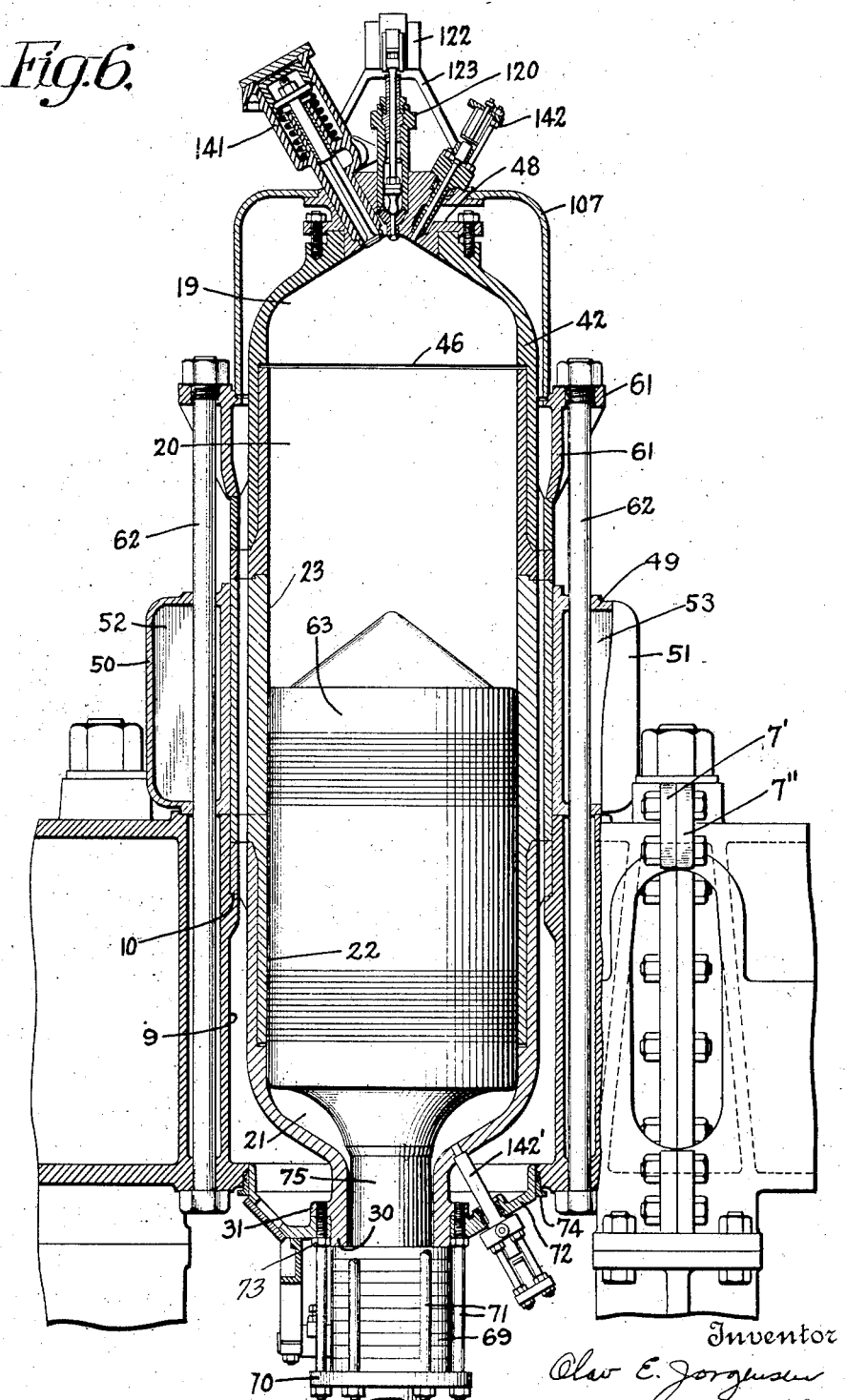

Further and more specific objects, features and advantages of the invention will more clearly appear from the detailed description given following taken in connection with the accompanying drawings which form a part of this specification and in which, Fig. 1 is a side elevation taken from the exhaust side of the engine and partly in section as designated in Fig. 3 by line 1—1, Fig. 2 is a vertical transverse section taken at 2—2 of Fig. 1, Fig. 3 is a plan view partly in section as designated in Fig. 1 by line 3—3, Fig. 4 is a vertical transverse section taken at 4—4 of Fig. 1, and showing more particularly the structural dynamic stress carrying framework of the engine, Fig. 5 is a vertical transverse section taken at 5—5 of Fig. 1 showing the details of power cylinder construction and associated parts, Fig. 6 is a vertical longitudinal section taken at 6—6 of Fig. 5, Fig. 7 is a vertical transverse section taken at 7—7 of Fig. 1 and showing more particularly the means for conducting cooling liquid to the piston rod, i. e. the piston cooling gear, Fig. 8 shows a modified form of cylinder construction, Fig. 9 shows a modified form of a detail of the construction shown in Fig. 8, Fig. 10 shows a piston unit in cross section, as at 10—10, of Fig. 11, Fig. 11 is a cross section at 11—11 of Fig. 10, Fig. 12 is a cross section at 12—12 of Fig. 11, and Figs. 13 and 14 are sections showing the construction of the liquid connection on the lower end of the piston rod of Fig. 10.

Before describing the present embodiment of the invention in detail, it might clarify matters to point out that the invention includes:

1. The structural characteristics for providing, more specifically, for the accommodation of the dynamic stresses inherent in an engine of this character during operation; and as shown herein this dynamic stress carrying structure is independent of any substantial thermal stresses;

2. Provision for the ready inspection or replacement of one or more of the various elements comprising the power cylinder units, without substantially disturbing the engine framework or larger structural units;

3. Improved means for conducting cooling liquid into and from the piston units, and for preventing contamination of cooling liquid by lubricating fluid and vice versa;

4. Improved structure of cylinder units; and

5. Improved details of construction and coordination of parts; all of which will be particularly understood by those skilled in the art after a full understanding of the following description and accompanying drawings.

It will be understood that only such parts of the complete engine have been shown in detail as are necessary for a full understanding of the invention; and various accessories or parts such as are common to engines of this character, and which are within the knowledge of those skilled in the art, have either been omitted, or merely diagrammatically shown, for purposes of clarity and to avoid an unnecessarily lengthy specification.

Referring to the drawings, and more particularly to Figs. 1 and 4: a suitable bed base 1, provided with supporting lugs 2, has attached to its lower side a drip pan 3 which forms in combination with the base the lower portion of the engine crank case. The base 1 in the preferred embodiment is made of one continuous piece extending the entire length of the engine; but it is of course understood that the base may be made of a plurality of parts, if desirable, to facilitate manufacture and these parts united into one structure by suitable means. The base 1 is provided with a plurality of journal portions 4 forming lower halves of the crank shaft journal boxes; and members, such as 5, provide upper halves located respectively in alignment with the members 4 and firmly attached to the same by suitable means. The journal boxes formed by the members 4 and 5 are provided with suitable journal liners. A plurality of A-frame members 6 are positioned in proper spaced relation along the base 1, supported thereby and extending upwardly therefrom, and a cylinder base 7 is supported on the top of the A-frames 6 extending substantially parallel to the bed base 1. In the present embodiment, the cylinder base 7 is formed in two sections 7' and 7" (Fig. 6) which are secured together by suitable means forming an integral longitudinally extending structural unit. The bed base 1, A-frames 6 and cylinder base 7 are rigidly secured together by suitable means such as the through bolts 8, which pass from the top of the cylinder base 7 continuously through to the bottom of the bed base 1, thereby securing these associated members firmly together and forming therewith a rigid structure adapted to carry the dynamic stress forces of the engine.

Referring more particularly to Figs. 1, 5 and 6: the cylinder base 7 is provided with a plurality of vertical bores 9 extending through the cylinder base from its top portion throughout its depth and each of these bores is provided with an inwardly extending supporting lug, such as the peripheral flange 10 (Figs. 1, 5 and 6). Vertical bores 9 are adapted to accommodate the lower ends of the respective cylinder units, which are supported from the respective lugs 10 by suitable shoulders formed on the cylinder units, in a manner to be more particularly pointed out following. Surrounding each respective vertical bore 9 in the cylinder base 7 is a relatively heavy wall 11 (Fig. 3), comprised in the present embodiment of reinforcing ribs provided with a plurality of peripherally spaced vertical holes 12 adapted to accommodate the cylinder tie bolts, and on the exhaust side of the engine adjacent each respective vertical bore is an outlet liquid chamber 13, and separated therefrom a liquid chamber 14; the liquid chamber 14 being in communication with the bore 9 through the hole 15 (Fig. 1), and the liquid chamber 14 being provided with a transverse rib 16 extending downwardly from the top thereof to a point spaced from the bottom thereof and forming thereby a cell 17, adapted to form an air chamber in the chamber 14.

*Cylinder units*

The cylinder units will be designated as such by the numeral 18, and the details of construction of each of said units (four in number in the present engine) are as follows: it being understood that the present embodiment represents a Diesel engine of the two-stroke cycle double acting type, and therefore each of the cylinder units is provided with intake and exhaust ports and with two cylinder ends. Referring more particularly to Figs. 5 and 6, each power cylinder comprises three zones, i. e. an upper zone comprising cylinder head 19 and working bore 20, associated therewith, a lower zone comprising cylinder head 21 and working bore 22 associated therewith, and an intermediate zone 23 containing a series of intake ports 24 on the intake side and extending in spaced peripheral relation around the intake side of the cylinder, and an upper series of exhaust ports 25 for the upper cylinder end and peripherally spaced around the exhaust side of the cylinder, and a lower series of exhaust ports 26 for the lower cylinder end and peripherally spaced around the exhaust side of the cylinder; the intake ports 24 providing intake ports in common to both the upper and lower cylinder ends, the exhaust ports 25 providing exhaust port means for the upper cylinder end and the exhaust ports 26 providing exhaust port means for the lower cylinder end. The cylinders 18 are each provided with an exteriorly extending supporting lug, such as the peripheral shoulder 27, adapted to rest in supported engagement with the supporting lug 10. Each cylinder is formed of the following elements: a lower cylinder end 28 provided with an outwardly extending portion, the lower edge of which forms the peripheral flange 27 and the upper edge of which provides an upper shoulder 29; the cylinder head proper being formed by an inner portion of the member 28 extending downwardly and being of cylindrical formation and then joining into an inwardly formed arcuate portion which merges into a truncated cone, whose included angle is approximately 120° in the present embodiment, and the extreme lower end of the member 28 extending downwardly into a neck portion 30 provided with an external flange 31 and having an internal bore for the accommodation of the piston rod. A lower liner member 32 is inserted within the member 28 and its lower end is vertically spaced from contact with the member 28 as at 33 to provide for longitudinal expansion; and formed integral with the member 32 is an upwardly extending portion 34 of a greater external diameter than the inwardly extending lower end, substantially coextensive in length with the intermediate zone above referred to, and having formed therein the exhaust and intake port means 24, 25 and 26, and being provided with a lower shoulder 35 in supported engagement with the shoulder 29, and having an upper shoulder 36 adjacent its upper end. The portion 34 is provided with vertical passages 37 spaced peripherally therearound and passing through the bridging portions intervening said intake and exhaust port means; said passages 37 serving as a means for the passage of cooling liquid to cool said bridging members, and also conducting said liquid in inter-communication between other liquid chambers in a manner to be more fully described following. An upper liner member 38 is provided with a peripheral enlargement 39 having a lower shoulder 40 in supported engagement with the shoulder 36 and having an upper shoulder 41 for supporting the upper cylinder end shell 28, and the member 38 is provided with an upwardly extending inner sleeve forming the upper working bore 20 of the cylinder. An upper cylinder end shell 42 is provided with a peripheral enlargement 43 having a lower shoulder 44 in supported engagement with the shoulder 41 and is also provided with an upper hold-down shoulder 45. The member 42 is in external surrounding engagement with the liner 38, providing a space 46 therebetween for the purposes of longitudinal expansion, as explained above in connection with the space 33; and the member 42 has a cylinder head formed similar to the lower cylinder head and is provided with an opening 47 for the accommodation of a valve plug 48, in the lower end of which is formed the extremity of the cylinder head 19. The enlarged portions of the cylinder shell ends 28 and 42 are provided with passages in respective communication with the passage 37.

Before describing the manner of attaching the cylinder units to the cylinder base, the intake and exhaust conduit means will first be described, since this structure is assembled in its usual order before the cylinders are mounted. Referring more particularly to Figs. 1, 3, 5 and 6: The intake and exhaust conduit means are formed in common, and a separate unit 49 is preferably provided for each respective cylinder. Each unit 49 is provided with outside walls 50 and 51 extending substantially across the width of the cylinder base 7 and having septum portions 52 and 53 for separating the exhaust side from the intake side. Each of the members 49 is provided with a vertical bore adapted to fit exteriorly of the median zone 23 of a cylinder unit 18, and spaced peripherally around this bore tubes 54 (Figs. 3 and 5) are inserted through the member 49 and are attached thereto as by expanding. The members 49 are attached to the cylinder base by suitable means, such as studs 55, with the bores in the members 49 in alignment with the respective bores 10 in the cylinder base 7. An intake manifold 56 is suitably attached to all of the members 49 at their respective intake sides and is in communication with each of the members 49 to place the air inlet side of said conduit means in communication with a suitable source for supplying air, such for example as with a suitable blower (not shown) driven either independently or by the engine itself. Suitable exhaust manifold sections, such as 57, are suitably attached respectively to the exhaust side of each of the members 49 (Figs. 1, 3 and 5) and are each provided with water jacket spaces such as 58 for circulating cooling fluid adjacent the exhaust ports. These respective exhaust pipe sections 57 are interconnected by exhaust pipe coupling sections 59 forming in combination with said sections 57 a continuous exhaust manifold whose outlet end is designated as 60 (Figs. 1 and 3). It will therefore be seen that the members 49, 56, 57 and 59 are interconnected to form a unit which is mounted on and supported by the cylinder base 7, in such a manner as to form a separate structure adapted to expand and contract and carry the thermal stresses caused by any variations in temperature to which it is subjected, without transmitting such thermal stresses in any substantial degree to the dynamic stress carrying structure of the engine. As is clearly shown in Fig. 3, the exhaust side of the members 49 is in communication with the exhaust port means formed in the cylinder units 18 and the intake side is in communication with the intake ports formed in the cylinder units 18.

After the parts have been assembled as above set forth, the cylinder units 18 are placed in the respective bores 9 with the lower end of each cylinder unit extending into its respective bore and being supported by the cylinder base 7 with the shoulders 27 in supported engagement with the shoulders 10, and with each cylinder unit positioned within its respective intake and exhaust conduit means and surrounded thereby substantially coextensive vertically with the vertical extension of the intermediate zone 23 of said cylinder unit, and with the lower end of each cylinder unit extending adjacent the bottom of its respective bore 9. Hold-down rings, such as 61, are now positioned over their respective cylinder units encircling the same and having their lower edges in seated engagement with the respective shoulders 45 of the cylinder units. Suitable tension members, such as the hold-down bolts 62, are inserted through holes formed in the cylinder base 7 and pass upwardly through the tubes 57 in the conduit means 49, and thence upwardly through the hold-down rings 61; and cooperating nuts are placed in threaded engagement on the respective bolts 62 to thereby firmly clamp the cylinder units against the cylinder base 7 and serving also to hold the various cylinder elements together. It will therefore be seen that the cylinder units are securely held in seated engagement against the cylinder base 7 by means independent of the intake and exhaust conduit means, and in a manner permitting the free removal of one or more of the cylinder units or its or their respective parts without the necessity of removing or disturbing either the intake and exhaust conduit means and associated manifolds or the dynamic stress carrying framework.

Suitable piston units, each including its respective piston rod, designated in their entirety respectively as 63, (Figs. 2, 5 and 6) are positioned in the respective cylinder units with their piston rods passing downwardly through the respective necks 30 and being attached (Figs. 2 and 7) adjacent their lower ends to respective crosshead members 64 which are each provided with a slide portion in slidable engagement with a suitable guide provided by the framework. Each crosshead is provided with a wrist pin 65, and these pins are engaged respectively by the upper ends of suitable connecting rods 66, whose lower ends engage the respective crank throws 67 of the crank shaft 68, which is journaled in the journal blocks 4 and 5. Each cylinder unit is provided, adjacent its lower end, with piston rod packing means comprising a series of packing rings 69 (see also Fig. 6) firmly clamped against the end of the neck 30 by means of a flange 70 and studs 71 engaging the flange 31 and passing through the closure means 72 which is held against the flange 31 by means of nuts 73 in screw threaded engagement with the studs 71; the closure means 72 extending outwardly to close the space between the lower end of the cylinder unit and the adjacent lower end of the respective bore 9, and a suitable packing means such as the ring 74 being positioned between each closure means and its cooperating bore 9 to form a liquid tight joint. The rings 69 serve to form a fluid tight running joint with the respective piston rods; and the closure plates 72, in combination with associated parts, serve to form liquid cooling jackets adjacent the lower end of each cylinder unit. The construction of the piston unit will now be described in detail.

Pistons

While any suitable form of piston may be employed, as is well understood by those skilled in the art, nevertheless, I prefer to use the piston to be described following as the preferred form of such a piston; this preferred form of piston being the subject matter of a separate copending application Ser. No. 238,383, filed December 7, 1927. Referring more particularly to Figs. 10 to 14, inclusive, 75 represents a piston rod which is provided with a longitudinal bore 76 extending throughout the rod from one end to the other and being reduced in diameter adjacent its lower end and provided at the junction between the larger and reduced bore with a gradually rounded shoulder 77. The upper end of the rod 75 is provided with an enlarged portion 78 having an upper and a lower shoulder. The lower end of the rod 75 is provided with a shoulder 79 and a threaded end 80 for purposes of attaching the rod to its respective crosshead. A suitable liner 81, preferably formed of non-corrosive material, and in the present embodiment made of two parts in threaded engagement one with the other, is inserted within the bore 76 and supported by the shoulder 77; the outer walls of the liner being in close fitting contact with the inner walls of the bore 76, and the liner is held in position within the bore by means of a plate 82 having an inwardly extending sleeve portion seated within a counter bore in the end of rod 75 and in interior screw-threaded engagement with the exterior of the liner 81. The liner 81 extends throughout the length of the bore 76 and forms a liquid passage adapted in the present embodiment to act as an inlet passage for cooling liquid and preventing the liquid from coming into contact with the rod 75. The piston body is formed with two independent pistons 83 and 84 comprising respectively the lower piston head and skirt and the upper piston head and skirt; and each piston is provided with a cooling liquid chamber designated respectively as 85 and 86. The lower piston 83 is provided with a bore adapted to accommodate the piston rod and this bore is positioned in fitting engagement with the piston rod and the piston 83 is seated against the lower shoulder of the enlargement 78. The upper piston 84 is seated against the upper shoulder of the enlargement 78 and held thereagainst by suitable means such as the studs and bolts 87. A member 88 is positioned within the chamber 86 in seated engagement with the upper end of the rod and having an inwardly, downwardly extending peripheral projection 89 seated within a bore on the upper end of rod 75 exteriorly of the upper end of the liner 81 and provided with a suitable packing ring 90 to form a liquid tight joint. The member 88 is constructed to provide a liquid header space 91 and an air pocket 92 positioned above the header space, and adjacent its upper portion is provided with an internal threaded boss in threaded and supporting engagement with a pipe 93 which extends downwardly interiorly of the liner 81 and projects a slight distance beyond the lower end of the rod 75; for purposes to be described following, and the combined header and air chamber 88 is attached to the upper end of rod 75 by suitable means such as studs 94 which pass downwardly through the enlarged portion 78 and in threaded engagement with the lower piston 83 serving thereby to hold the piston 83 in seated engagement on lower shoulder of the enlargement 78. The bosses formed in the member 88 for the accommodation of bolts 94 are constructed and arranged as shown in Fig. 11, so that alternate spaces between these bosses are within the confines of the member 88 and the corresponding series are without the confines of the member 88. The enlargement 78 is provided with a series of holes 95 extending substantially parallel to the bore ring within rod 75 and arranged in a spaced peripheral series in the spaces between the bolts 94 and alternately in alignment respectively with the series of spaces within the confines of the member 88, and with the series of spaces without the confines of the member 88. Liners 96 are positioned in the respective holes 95 and are suitably prevented from displacement therein. One series of liners will be designated as 96′ and the other series as 96″ (Fig. 11); the series 96′ being in communication at their upper ends with the header space 91 and at their lower ends with the piston chamber 85; while the alternate liners 96″ are in communication at their upper end with the piston chamber 86 and at their lower ends with the piston chamber 85. It will therefore be seen that any liquid passing up through the liner 81 will flow outwardly into the header 91, downwardly through the liners 96′, into the lower piston chamber 85, upwardly through the liners 96″ and into the upper chamber 86, from where it will flow through the outlet conduit 93 downwardly; and at all times, by means of the various liners above described, and cooperating structure, the liquid will be kept from contact with the piston rod. This is an extremely important feature, as will be more particularly pointed out in the said copending application above referred to. The piston 84 adjacent its lower end is provided with a peripheral shoulder 97 and the piston 83 is provided adjacent its upper end with a peripheral groove 98. Suitable bridging means such as the split sleeve 99 (Fig. 11) is provided with an inwardly extending peripheral shoulder 100 in engagement with the groove 98 and its upper edge surrounding the lower end of the piston 84 and slightly spaced from shoulder 87; the split sleeve 99 being attached in position by suitable means such as nuts and bolts and being adapted for expansion and contraction vertically and laterally, and having its outer surface normally coextensive with the outer diameters of the pistons 83 and 84, except of course for that portion which as shown in the drawings is provided with the means for attaching the sleeve, which portion is recessed below the outer surface; in the present embodiment the sleeve 99 is substantially coextensive in length with the enlargement 78 of the piston rod 75. Suitable piston grooves are provided in each of the pistons 83 and 84 and accommodate suitable piston rings in a manner well understood in the art. A connection 101 is attached to the end of the piston rod 75 by suitable means such as studs 102 serving the purpose of connecting the respective inlet and outlet passages with suitable means for supplying and taking away the cooling liquid through the respective pipes 103 and 104; the interior of the member 101 being provided with a bore 105 into which the lower end 106 of the outlet pipe 93 extends with a sliding fit. It will therefore be seen that the liner 81 is secured only at its lower end and is supported with a sliding fit at its upper end allowing for substantially unrestricted longitudinal expansion and contraction and similarly the outlet pipe 93 is attached adjacent its upper end and is slidingly supported at its lower end allowing for substantially unrestricted longitudinal expansion and contraction.

Referring more particularly to Figs. 5, 6 and 10: It will be noted that each piston unit adjacent each head thereof is formed with deflecting portions 163, those of the upper piston ends being designated as 163′ and those of the lower as 163″, and each of which extends partly around the piston wall on the intake side thereof (coextensive in circumference with the ports 24), and is formed in the running surface of the piston. This deflector portion provides a means of taking the inlet air into the cylinder units and deflecting it upwardly while preventing it from traveling around the piston portion diametrically adjacent to the deflector portion; and thereby deflects the intake air upwardly, causing it to entirely sweep the exhaust gases out through the exhaust ports, while preventing any substantial amount of air from leaking directly around the piston and out through the exhaust ports. This is of great advantage in engines of this character and results in a substantial saving of power. In addition it obviates the necessity of "building up" a deflector surface and hence may be utilized to great advantage on flat end pistons such as shown in Fig. 8.

Referring more particularly to Figs. 1, 2 and 3: Each cylinder unit 18 is provided with an upper exteriorly fitting jacket 107 seated at its lower end in the corresponding holder ring 61 and forming therewith a liquid tight joint, and having its upper end in liquid tight engagement with the valve plug 48; thereby providing a liquid jacket for the upper end of each cylinder unit; each jacket 107 being provided with a pipe connection 108 placing the respective liquid jackets in communication with the respective liquid jackets 58 formed on the exhaust segments, and the liquid jackets 58 of the exhaust segments being connected to a common outlet pipe 109. A liquid inlet pipe 110 (Figs. 2 and 7) serves as a common means for conducting cooling liquid to the piston cooling reservoir chambers 14, and the valves 111 are placed in the inlet line controlling the inlet supply to the respective reservoirs 14. A liquid outlet pipe 112 is in communication respectively with the chambers 13 forming a common means for taking the outlet liquid from these chambers.

Each pipe connection 108 is provided with a suitable regulating valve such as 108' for regulating the outlet from the cylinder jackets and therefore providing means for regulating the piston cooling.

Piston cooling gear

Referring more particularly to Figs. 1 and 7: Each of the reservoirs 14 is provided adjacent its bottom with a vertical hole into which telescopically extends the pipe 113 acting as a conduit to carry the inlet cooling liquid to its respective piston; and a stuffing box 114 is positioned between each respective reservoir 14 and corresponding conduit 113; serving to prevent undue leakage of cooling liquid from the reservoir while permitting reciprocal motion of the pipe 113. The lower end of pipe 113 passes downwardly through a portion of the supporting structure designated as 115, and which is constructed in the form of a trough to conduct away the seepage from the stuffing box 114, in a manner to be more particularly pointed out following; and a suitable stuffing box 116 is provided between the portion 115 and the pipe 113 and is adapted to prevent undue leakage of lubricating oil from the crank case outwardly while permitting reciprocal movement of the pipe 113; the stuffing box 116 should preferably be a suitable structure provided with scraper rings. The lower end of the pipe 113 is attached to an arm 117, such as by threaded engagement, and the arm 117 is rigidly attached to the reciprocable crossheads 64; and the pipe 113 is in liquid communication with the connection 101 through the pipe 103. A drip washer 118 is attached to the pipe or conduit 113 intermediate its ends and at all times lying between stuffing boxes 114 and 116 by suitable means such as by threaded engagement. The washer 118 is provided with a downwardly and outwardly flaring wall terminating at its outer edge with an upwardly and inwardly flaring flange and provided adjacent said flange with drain holes 119; and the lower side of the washer 118 is preferably formed with a downwardly and outwardly flaring wall; the outer portion of the washer 118 containing the holes 119 being spaced a substantial distance outwardly from the tube 113. It will therefore be seen that any liquid which seeps through the packing 114 will be conducted outwardly by the upper face of the washer 118 to a point substantially removed therefrom where it will preferably pass downwardly through the drain holes 119 and will be caught in trough 115 and conducted away from the crank case. Also, any oil or other lubricating medium which works by the stuffing box 116, due to the repeated reciprocation of the tube 113, will be restricted on its upward movement by the underside of the washer 118. It will therefore be seen that the means herein provided prevents the upward or downward flow or movement of a liquid on the outside of the pipe or conduit 113; thereby preventing the contamination of cooling liquid by lubricating fluid or vice versa. This heretofore has been a troublesome problem, causing great annoyance, since, as will be appreciated, the contamination of cooling liquid by oil or other lubricating medium is detrimental to the proper cooling of the piston due to the fact that such lubricating medium adheres to the inner surfaces of the cooling passages and chambers forming a coating which acts as an insulator against heat conductivity; and it will likewise be appreciated that contamination of the lubricating medium by a cooling liquid such as water is detrimental to the proper lubricating functions depended upon by the lubricating medium.

A troublesome problem, which I have solved by this invention, is the undesirable effect heretofore caused by the pulsating liquid columns in the piston cooling gear, by which term I mean to include the reciprocating piston and all parts connected and moving therewith. For example, when the engine is in operation, there is always a column of water within the piston rod and within the conduit 113, and since these members attain relatively large proportions in engines of this character, the columns of liquid attain considerable inertia; this inertia resulting in pulsations sometimes producing hammering. As has been pointed out above, I have provided at the top of the inlet water system in each piston an air chamber 92, and I have provided adjacent the top of each piston cooling reservoir 14 an air chamber 17. These air chambers provide a cushioning means for effectively absorbing without shock the pulsating liquid columns.

Operating valves, etc.

Referring particularly to Figs. 1 and 5: The cylinder units are each provided respectively with fuel valves in each cylinder head. For example (Fig. 5) the top cylinder head of each cylinder is provided with a fuel spray valve, such as 120, which may be of any suitable structure, and which is positioned in the valve plug 48 with its inner end entering the upper cylinder head at the apex thereof. The usual attachments are made from the valve 120 placing it in communication with the suitable fuel oil and compressed air supply means, which for purposes of clarity in the drawings have been omitted. The valve 120 is provided with a valve operating stem 121 attached at its upper end to lever 122 which is pivotally supported from the engine by a bracket 123 and whose other end is pivotally attached to the push rod 124, which passes downwardly through the member 49, through one of the tubes 54 and thence into an enclosure formed in the cylinder base 7, where its lower end is in pivotal engagement with the cam arm 125 adapted to be operated by a suitable cam (not shown) carried on the cam shaft 127.

The lower cylinder heads are each provided with two fuel valves, such for example as the valves 128 and 129, which pass through and are carried by the closure plate 72 and whose nozzles pass through the lower cylinder head 28 and into communication with the cylinder head. The two valves are used in the lower cylinder head to more properly distribute the atomized fuel around the lower end of the piston at its junction with the piston rod. It will be noted that due to the compact structure of the piston rod packing means 69 and the peculiar construction and cooperation of the parts of the engine adjacent the lower end of the cylinder units, that the valves 128 and 129 are placed very close to the piston rod and entirely within the A-frame structure and substantially within a peripheral area defined by a projection of the respective bores 9. The fuel valves 128 and 129 are provided respectively with valve stems 130 and 131 attached respectively to the lever arms 132 and 133, which are respectively pivotally supported by the bracket 134 suitably secured to a relatively stationary part of the engine. The lever 133 is pivotally attached to the link rod 135 whose other end is attached to the cam arm 136 which carries a cam roller 137 in operative engagement with the cam 126; the cam levers 125 and 136 being pivotally supported on a shaft 138 which carries eccentric portions engaging the respective arms 125 and 136 and which is adapted upon rotation to change the position of the arms 125 and 136 in connection with the reversing of the engine, which is well understood in the art. The arm 133 is provided with an inner end 139 which is adapted for operative engagement with the end 140 of the arm 132, and the end 140 is provided with adjustment means to effect suitable adjustment between these two parts; whereby upon operation of the arm 133, the arm 132 is simultaneously operated to synchronously move the valve stems 130 and 131 to thereby effect injection of fuel to the respective cylinders.

Each upper cylinder head is also provided with a start-valve such as 141 (Figs. 6, 1 and 3) and with a safety valve such as 142; these starting and safety valves being inserted in the respective valve plugs 48. It will therefore be seen that each of the respective plugs 48 carries a starting valve, a fuel valve, and a safety valve; and that these various valves pass through the plug and are in communication with the interior of the cylinder heads without passing through the cylinder head water jackets. This greatly simplifies the construction of the cylinder heads and obviates the necessity of complicated water jackets; futher providing means for ready removal of any individual valve or the removal of all of the valves of each upper cylinder head together with the respective plug carrying the same. A safety valve such as 142' (Fig. 6) is provided in the lower end of each cylinder unit; but since the starting of the engine is effected by a compressed air charge on the upper ends of the respective pistons only, the starting valves such as 141 are only supplied to the upper heads of the respective cylinder units.

A suitable fuel pump and pilot valve for operation of the starting valve is somewhat diagrammatically shown in Fig. 7; it being understood that in the present embodiment one of these fuel oil pumps and one of these pilot valves are provided for each cylinder. The fuel pump is designated as 143 and is carried by a supporting housing 144 which is suitably attached to the base 7. The fuel pump is provided with a piston rod 145 adapted to be operated by a cam lever 146 which is pivotally supported as at 147 and carries at its opposite end a cam roller 148 in engagement with a suitable cam 149, which is attached to and operated by the cam shaft 127. The pilot valve will be designated as 150 and is provided with a stem 151 lying adjacent to and adapted to be operated by the same end of the lever 146 which operates the rod 145; it being understood that suitable connections are made from the pilot valve and from the fuel pump to the proper air and fuel supply sources of the engine, as is well understood by those skilled in the art.

The cam shaft 127 is connected to the crank shaft 68 (Fig. 1) by any suitable means (not shown) carried in the housing 152. A suitable air compressor is diagrammatically represented in Fig. 1 as 153, and is adapted to furnish air under pressure for supplying atomized fuel to the cylinders. As indicated above, various parts, such for example as the blower for furnishing air to the cylinders, fuel tanks and lines, compressed air tanks for starting, and various other pipe connections and miscellaneous auxiliary parts have been omitted for the sake of clearness in the drawings; since all of these parts and connections, etc. are well understod by those skilled in the art, and since a description of them is not necessary for a complete understanding of the present invention, and such description and illustrated showing would merely be a repetition of parts of such engines well known and understood to those skilled in the art.

Modified cylinder

In Fig. 8, I have shown a modified form of cylinder construction, which embodies many of the features and advantages set forth above in connection with the preferred form of cylinder construction as shown in Fig. 5. The present modified form being more particularly adapted for engines of smaller size in which the cylinder units are not subjected to such enormous stresses and strains as in the case of larger engines. In this modification, the cylinder unit is formed as follows. The cylinder body 154 is formed in one piece, such as by casting, and provides a continuous inner wall 155 serving both the upper and lower ends of the cylinder unit. The lower end of the member 154 forms a cylinder head and provides an opening 156, through which the piston rod is adapted to pass; having formed integral with the lower end a closure flange 157 adapted to close the space between the lower cylinder end and the bore 9, formed in the cylinder base 7. The packing rings 69 are attached by flanges and bolts in a manner similar to that described in connection with the preferred embodiment; and suitable packing means, such as 74, is inserted between the flange 57 and the member 7 in a manner similar to that above described in connection with the preferred embodiment. The member 154 adjacent its middle region is provided with an enlarged portion 158 having formed therein the vertical passages 159 corresponding to the passages 37 in the preferred embodiment. The lower end of the enlargement 158 provides a shoulder 160, corresponding to the shoulder 35 of the preferred embodiment and supported on the shoulder 10 formed on the cylinder base 7. The combined head and hold-down ring 161 is formed integrally as by casting and is seated in a recess in the end of the member 154, tightly fitting the same and adapted to accommodate the hold-down bolts 62, which pass through the member 49 and through the cylinder base 7 and engage the base 7 in a manner identical with that above pointed out in connection with the preferred embodiment. The member 161 serves to carry the starting, fuel and safety valves, which in the preferred embodiment were carried by the plug 48. A sleeve 162 is in liquid-tight engagement with the upper end of cylinder member 154 and at its lower end is in liquid-tight engagement with the enlargement 158; thereby forming a cooling jacket for the upper cylinder end, which is in communication with the passages 159. The passages 159 are also in communication at their lower ends with a space formed between the lower end of cylinder member 154 and the bore 9 of the cylinder base 7; and the circulation of cooling fluid through these chambers and passages is effected substantially in the manner above described in connection with the preferred embodiment, except that in this modification the cooling jacket for the extreme upper end of the cylinder head is formed in the member 161. The fuel valves are positioned in the bottom end of the cylinder in a manner similar to that described in connection with the preferred embodiment; or as a further modification these valves may be positioned as shown in Fig. 9, wherein they are placed with their axes substantially parallel to the axis of the cylinder. Intake and exhaust ports are formed in a manner identical with those of the preferred embodiment.

Operation

The engine having been properly connected to fuel source and blower means to furnish the fresh air to the cylinders and the suitable compressed air tanks having been properly connected to the engine in a manner well understood by those skilled in the art; the engine must first be turned over by suitable means before the engine will operate as a complete internal combustion engine, since the ignition of the engine results from the high compression characteristics of Diesel engines. The initial operation of the engine is therefore accomplished by suitable means, such for example as by compressed air admitted to the upper cylinders through the starting valves 141 at properly timed intervals. The valves 141 are controlled by suitable means, such as the pilot valves 150, which are operated as above described, by suitable cams.

After the engine is thus set in motion by compressed air, the fuel is turned on and the regular cycle of operation takes place as follows. Starting with a piston in one cylinder at a point near its top position, having compressed above it during its up stroke, a charge of air taken in through the air intake 56 and the intake ports 24, the fuel valve is now opened and through means of compressed air the fuel is atomized into the cylinder as through fuel valve 120, and as the piston continues to move upwardly the ignition of the entire charge will be effected by the high temperature attained by the high compression of the gases within the upper end of the cylinder. Following this ignition, there is a rapid rise in temperature and the charge expands, to force the piston downwardly on its power stroke. For a short part of this down power stroke, the expansion of air keeps up with the increase of the cylinder volume in which it is contained and the pressure will remain nearly constant, (around 500 lbs.) but soon the combustion will be finished, development of additional heat ceases and a further expansion will take place under decreasing pressure. When the piston has moved down to a position about 22% of the stroke from its bottom dead center, the piston, now acting as a slide valve in connection with the exhaust ports 25, will open these ports and the spent gases will exhaust into the exhaust pipe 60 and be carried to the atmosphere through the exhaust pipe; and as the piston moves down further the gas pressure in the cylinder will fall off very rapidly and will substantially reach that of the atmosphere, at which point the piston has now moved down to open the intake ports 24 allowing air to be admitted to the cylinder from the intake conduit 56, which is charged with air under a suitable pressure, such as 1½ to 3 lbs., by means of a suitable blower driven independently or by the engine itself. This intake air sweeps in against the deflector surface 163' of the piston, upwardly through the upper cylinder chamber, and downwardly blowing the spent gases out through the exhaust ports; thereby effecting scavenging. During this downward movement of the piston, air, taken in through ports 24 from conduit 56, has been simultaneously compressed in the lower end of the cylinder and just before the piston reaches the lowermost part of its stroke, atomized fuel is injected into the compressed air through the valves 128 and 129 and the cylinder continues to move to the end of its down stroke, at which time combustion takes place and removed in time just a half revolution from the combustion in the upper chamber. This drives the piston upwardly, at the same time pressing the fresh air charge which continues to flow into the cylinder after the spent gases have been exhausted ahead of it; and this charge in the upper cylinder is compressed and the cycle is ready to commence again.

It will therefore be seen that the compression in the bottom cylinder takes place during the combustion and expansion stroke in the top cylinder, and vice versa; with the explosion strokes in opposite ends of the same cylinder being respectively separated one from the other a half revolution of the crank shaft. This double action makes it possible to utilize the running gear of the engine to its full working capacity, and therefore allows increased power to be produced in an engine of a given weight.

The fuel spray valves are opened and closed at the proper time by means of the cams 149 placed on the cam shaft 127, which is driven at engine speed from the crank shaft by any suitable means. As above explained, both ends of each cylinder are furnished with safety relief valves, which by opening under too great a pressure give warning of some disturbance in the proper functioning of the engine and also tend to reduce the gas pressure in the cylinder under these conditions. The fuel is injected by means of compressed air under a pressure of usually around 800 to 1000 lbs. per square inch, which is compressed preferably in a multi-stage air compressor, driven independently or by the engine itself. It is of course understood by those skilled in the art that fuel may be injected by pressure alone without the use of air.

The reciprocal motion of the pistons 63 resulting from the various combustion impulses in the numerous cylinders is transmitted by the respective piston rods 75 and through wrist pins 65 delivered to the crank shaft 68, through the intermediary of the respective connecting rods 66, to thereby convert the reciprocating motion originating in the piston members to a resulting rotary motion in the crank shaft 68. It is to be particularly noted that when the explosion stroke is on the upper ends of the pistons, there is an upward force exerted on the cylinder units, which places the through bolts 62 under tension, the cylinder base 7 under compression and the through bolts 8 under tension, and base 1 under compression; while when the explosion stroke is on the bottom ends of the pistons, a downward force is exerted directly on the cylinder base 7, which places the cylinder base 7, A-frame 6, and the engine base 1 in direct compression. It will therefore be seen that both the up and down forces created by the explosions within the cylinder units result in a compression of the cylinder base 7, and engine base 1; and that more particularly the cylinder base 7 is always in compression during the operation of the engine, while the tension stresses are carried by the through bolts provided for this purpose. It is very important in engines of this kind that the large structural members, which are usually castings, be subjected to compression rather than tension. In this connection it is also important to note that the dynamic stress carrying framework of the engine is in effect a separate structure from that part of the engine comprising the members 49, 57, 59, etc., and which are subjected to substantial thermal stresses. And conversely, those parts which are subjected to thermal stresses are substantially free from dynamic stresses. As has been pointed out hereinbefore, this is extremely important in engines of this character, as will be appreciated by those skilled in the art; since great temperature changes in castings of this size necessarily cause a certain amount of expansion and contraction, which, if subjected to parts carrying the dynamic stress, often result in breaking of such parts.

In the operation of the engine, the piston elements are cooled by cooling liquid passing in through pipe 110 to the respective piston cooling reservoirs 14, thence downwardly through conduits 113, across through pipes 103, in through connections 101, up within the liner 81, out into the header 91, downwardly through the pipes 96', into the respective cooling chambers 85, upwardly through the pipes 96'', into the respective upper piston chambers 86, downwardly through the respective pipes 93, out through the pipes 104, and upwardly through the conduits 113' (which correspond in all particulars to the conduits 113), and thence into the chambers 13 and out through the pipe 112, back into the liquid supply. As has been pointed out above, the air chambers 92 (in the piston heads) and 17 (in the upper part of the liquid reservoirs 14) serve the purpose of cushioning the pulsating water columns.

Having thus described my invention with particularity with reference to its preferred form, and having referred to certain modifications, it will be obvious to those skilled in the art, after understanding my invention, that various changes and other modifications may be made therein without departing from the spirit and scope of my invention, and I aim in the appended claims to cover such changes and modifications as are within the scope of the invention.

What I claim as new and desire to secure by Letters Patent is:

1. In an internal combustion engine, the combustion of a lower structural framework, a cylinder base attached thereto, a power cylinder attached to said cylinder base, and means supported by said base and surrounding said cylinder and providing scavenging air and exhaust gas passages free from effective thermal contact with said base, said cylinder base being interposed between said structural framework and said last mentioned means.

2. In an internal combustion engine, the combination of a lower structural framework, a cylinder base attached thereto by tension members, a power cylinder attached to said cylinder base by tension members, and means supported by said base and surrounding said cylinder and providing scavenging air and exhaust gas passages, said cylinder base being interposed between said framework and said last means and said means being free from any substantial stresses caused by the working forces created within and transmitted by said power cylinder to said structural framework.

3. In an internal combustion engine, the combination of a lower structural framework, a cylinder base attached thereto by tension members, a power cylinder attached to said cylinder base by tension members, and means supported by said base and surrounding said cylinder and providing scavenging air and exhaust gas passages, said base being interposed between said framework and said last means and being free from any substantial thermal stresses.

4. In an internal combustion engine having a plurality of power cylinders, the combination of a lower structural framework, a cylinder base common to all of said cylinders attached to said framework by tension members, a plurality of power cylinders carried by said base and attached thereto, each of said cylinders being individually provided respectively with combined scavenging air and exhaust gas conduit means attached together to provide a scavenging air passage and an exhaust passage and attached to and carried by said base, and said means adapted to be removed without the removal of said base, said base being free from any substantial thermal stresses and being interposed between said frame and said means.

5. In an internal combustion engine, the combination of a cylinder base comprised as a working stress part of said engine structure, an explosion cylinder supported in and carried by said base and provided with intake and exhaust ports, and conduit means carried by said base and supplying intake and exhaust passages in communication with said intake and exhaust ports and being free from any substantial working stresses of said engine and adapted to be removed without the removal of said base.

6. In an internal combustion engine, the combination of a cylinder base provided with a vertical bore, a power cylinder provided with an upper region, an intermediate region and a lower region with intake and exhaust ports in said intermediate region and having its lower region seated in said bore, said cylinder being attached to said base, and conduit means formed entirely separately from said base but supported thereby and lying adjacent to said intermediate region and providing intake and exhaust passages in communication with said ports.

7. In an internal combustion engine of the double acting type, the combination of a cylinder base provided with a vertical bore extending therethrough, a power cylinder having upper and lower cylinder heads, the lower of which is positioned within said bore extending adjacent the bottom thereof, said cylinder being provided with means for supporting it from said base, and intake and exhaust conduit means formed independent of said cylinder base and supporting means.

8. In an internal combustion engine of the double acting type, the combination of a cylinder base provided with a vertical bore and liquid chambers, intake and exhaust conduit means supported by said base and provided with a bore in register with said bore in said base, a cylinder provided with upper and lower cylinder ends and having intermediate intake and exhaust port means common to both of said ends with bridging members between said ports having liquid passages extending vertically therethrough, said cylinder being positioned within said bores and supported by said base free to be removed therefrom without removing said conduit means, said liquid passages being in communication with a lower liquid jacket formed between said base and said lower cylinder end and said lower liquid jacket being in communication with said liquid chamber, and jacket means spaced from said upper cylinder end providing an upper liquid jacket also in communication with said vertical liquid passages.

9. In an internal combustion engine of the double acting type, the combination of a cylinder base provided with a vertical bore, intake and exhaust conduit means supported by said base and provided with a bore in register with said bore in said base, a cylinder provided with upper and lower cylinder ends and having intermediate intake and exhaust port means common to both of said ends with bridging members between said ports having liquid passages extending vertically therethrough, said cylinder being positioned within said bores and supported by said base free to be removed therefrom without removing said conduit means, said liquid passages being in communication with a lower liquid jacket formed between said base and said lower cylinder end, and jacket means spaced from said upper cylinder end providing an upper liquid jacket also in communication with said vertical liquid passages.

10. In an internal combustion engine of the double acting type, the combination of a dynamic-stress-carrying frame structure for transmitting reciprocal motion from power cylinder means to rotary motion in crank shaft means, exhaust gas conduit means supported by said frame, a power cylinder having two heads, members passing from a point above said conduit means vertically downwardly past said conduit means and into said frame, for attaching said cylinder to said frame independently of said conduit means whereby said power cylinder may be removed from said frame without removing said conduit means and without disturbing said frame structure.

11. In an internal combustion engine, the combination of a bed base, A-frame means extending upwardly therefrom and supported thereby, a cylinder base mounted on said A-frame means, tension members securing said bed, said A-frame means and said cylinder base together and forming therewith the stress carrying structural framework of the engine, intake and exhaust conduit means supported on said cylinder base independent of said tension members, and a power cylinder attached to said base structurally independent of said conduit means.

12. In an internal combustion engine of the double acting type, the combination of a bed base, A-frame means extending upwardly therefrom and supported thereby, a cylinder base mounted on said A-frame means, through bolts passing through and securing together said bed, said A-frame means and said cylinder base and forming therewith the stress carrying structural framework of the engine, intake and exhaust conduit means supported on said cylinder base independent of said through bolts, and a power cylinder attached to said base structurally independent of said conduit means.

13. In an internal combustion engine of the double acting type, the combination of a bed base, A-frame means extending upwardly therefrom and supported thereby, a cylinder base mounted on said A-frame means, through bolts passing through and securing together said bed, said A-frame means and said cylinder base and forming therewith the stress carrying structural framework of the engine, intake and exhaust conduit means supported on said cylinder base independent of said through bolts, and a power cylinder supported by said base and attached thereto by bolts passing through said base.

14. In an internal combustion engine the combination of, a lower structural framework of the cross head type, a cylinder base supported by said framework and attached thereto by tension members and provided with a plurality of bores having shoulders adapted to support power cylinders respectively one in each bore, a plurality of power cylinders each comprising an upper zone, an intermediate zone and a lower zone, said upper zone being provided with cooling means and having a cylinder head integral with a part of the cylinder and containing a part of the cylinder bore, said intermediate zone being provided with ports for scavenging air and exhaust gas, said lower zone being provided with cooling means and having a cylinder head integral with a part of the cylinder and containing a part of the cylinder bore and being provided with a central opening in said head adapted for the passage therethrough of a piston rod and having a supporting shoulder, said power cylinders being supported by their respective shoulders from the respective shoulders formed in the cylinder base bores and said cylinders passing through the entire depth of said cylinder base in the direction of the cylinder axes and being attached to the said cylinder base by tension means connected to the upper cylinder zone, piston rods passing respectively through the said central openings of the lower cylinder heads, pistons in said respective cylinders each provided with an upper and a lower piston head cooperating pairs of which being attached respectively to said piston rods, conduit means supported by said cylinder base on the cylinder base side opposite the framework and surrounding the cylinders and providing passages for scavenging air to the said scavenging air ports and for exhaust from said exhaust ports and being unaffected by the combustion forces transmitted by the said tension means attaching the upper cylinder zones to the cylinder base, said scavenging and exhaust conduit being independent of the cylinders and of said cylinder cooling means and permitting the removal of the cylinders from the cylinder base without dismantling the said conduit means.

15. In an internal combustion engine the combination of, a lower structural framework, a cylinder base supported by said framework and attached thereby by tension members and provided with a plurality of bores having shoulders adapted to support power cylinders respectively one in each bore, a plurality of power cylinders each comprising an upper zone, an intermediate zone and a lower zone, said upper zone being provided with cooling means and having a cylinder head, said intermediate zone being provided with ports for scavenging air and exhaust gas, and said lower zone being provided with a shoulder, said cylinders being mounted in said respective bores and supported therein by cooperating engagement between the respective pairs of shoulders formed on the lower cylinder zones and in the base bores, and said cylinders extending through the entire depth of said base in the direction of the cylinder axes and being attached to the said cylinder base by tension means connected to the upper cylinder zone, independently formed conduit means resting on an attached to said cylinder base and being located below the uppermost extremity of said tension means, said conduit means comprising individual units respectively for each of said cylinders and forming passages for scavenging air to the said scavenging air ports and for exhaust gas from the said exhaust ports and provided with a partition between the part adapted for scavenging air and the part adapted for exhaust gas and adapted to separate the exhaust gas and scavenging air from direct contact with the said cylinder base and being unaffected by the combustion forces transmitted from the said tension means attaching said cylinders to said base and being independent of the said cylinders and the said cylinder cooling means and permitting the removal of the said cylinder from the said cylinder base without dismantling the said conduit means and permitting the removal of said conduit means without dismantling the said cylinder base.

16. In an internal combustion engine the combination of, a lower framework of the cross head type, a cylinder base supported by the said framework and attached thereto by tension members and provided with a plurality of bores having shoulders adapted to support a plurality of power cylinders respectively one in each bore, a plurality of power cylinders each comprising an upper zone, an intermediate zone and a lower zone, said upper zone being provided with cooling means and having a cylinder head, said intermediate zone being provided with ports for scavenging air and exhaust gas, and said lower zone being provided with cooling means and having a cylinder head provided with a central opening adapted for the passage therethrough of a piston rod and having a shoulder supporting said cylinder, said cylinders being positioned in respective bores in said cylinder base and being supported respectively therein by cooperation between said cylinder shoulders and said base bore shoulders and said cylinders passing through the entire depth of said base in the direction of the cylinder axes and being attached to said cylinder base by tension members connected to the upper zone of said respective cylinders, pistons positioned respectively in said cylinders and each provided with an upper and a lower piston head attached to a piston rod, piston rods attached respectively to said pairs of piston heads and passing respectively through the central openings of the said lower zones of said cylinders, conduit means resting on and rigidly secured to but formed independently of the cylinder base providing passages for scavenging air to the said scavenging air ports and for exhaust gas from the said exhaust ports and comprising individual casings for and surrounding respective cylinders and having a partition separating scavenging air from exhaust gas and having a wall separating the exhaust gas from the cylinder base and permitting the tension means attaching the said cylinders to the said cylinder base to pass through said conduit, said conduit being independent of said cylinder and of said cylinder cooling means and permitting the removal of the said cylinders and the said cylinder base without dismantling said conduit means and permitting the removal from said conduit means of said cylinder base without dismantling said cylinder base.

17. In an internal combustion engine the combination of, a lower framework of the cross head type, a cylinder base supported by the said framework and attached thereto by tension members and provided with a plurality of bores having shoulders adapted to support a plurality of power cylinders respectively one in each bore, a plurality of power cylinders each comprising an upper zone, an intermediate zone and a lower zone, said upper zone being provided with cooling means and having a cylinder head integral with a part of the cylinder and containing a part of the cylinder bore, said intermediate zone being provided with ports for scavenging air and exhaust gas, and said lower zone being provided with cooling means and having a cylinder head integral with a part of the cylinder and containing a part of the cylinder bore and being provided with a central opening adapted for the passage therethrough of a piston rod and having a shoulder supporting said cylinder, said cylinders being positioned in respective bores in said cylinder base and being supported respectively therein by cooperation between said cylinder shoulders and said base bore shoulders and said cylinders passing through the entire depth of said base in the direction of the cylinder axes and being attached to said cylinder base by tension members connected to the upper zone of said respective cylinders, pistons positioned respectively in said cylinders and each provided with an upper and a lower piston head attached to a piston rod, piston rods attached respectively to said pairs of piston heads and passing respectively through the central openings of the said lower zones of said cylinders, conduit means resting on and rigidly secured to but formed independently of the cylinder base providing passages for scavenging air to the said scavenging air ports and for exhaust gas from the said exhaust ports and comprising individual casings for and surrounding respective cylinders and having a partition separating scavenging air from exhaust gas and having a wall separating the exhaust gas from the cylinder base and permitting the tension means attaching the said cylinders to the said cylinder base to pass through said conduit, said conduit being independent of said cylinder and of said cylinder cooling means and permitting the removal of the said cylinders and the said cylinder base without dismantling said conduit means and permitting the removal from said conduit means of said cylinder base without dismantling said cylinder base.

18. In an internal combustion engine the combination of, a lower structural framework of the cross head type comprising frames and bed plate, a cylinder base supported by said framework and attached thereto by tension members and provided with a plurality of bores having shoulders adapted to support power cylinders respectively one in each bore, a plurality of power cylinders each comprising an upper zone, an intermediate zone and a lower zone, said upper zone being provided with cooling means and having a cylinder head integral with a part of the cylinder and containing a part of the cylinder bore, said intermediate zone being provided with ports for scavenging air and exhaust gas, said lower zone being provided with cooling means and having a cylinder head integral with a part of the cylinder and containing a part of the cylinder bore and being provided with a central opening in said head adapted for the passage therethrough of a piston rod and having a supporting shoulder, said power cylinders being supported by their respective shoulders from the respective shoulders formed in the cylinder base bores and said cylinders passing through the entire depth of said cylinder base in the direction of the cylinder axes and being attached to the said cylinder base by tension means connected to the upper cylinder zone, the said tension means attaching said cylinders to the cylinder base comprising clamping rings respectively surrounding said cylinders and resting respectively on shoulders formed on the upper cylinder zones and bolts passing through said clamping rings and said conduit means and said cylinder base and provided with nuts on both ends, whereby the combustion pressure acting on the top cylinder heads is transmitted to the entire part of said cylinder base, said tension members attaching the cylinder base to the framework comprising tie bolts extending through the cylinder base and the frames and bed plate and attached to the bed plate and being provided with nuts on top of the cylinder base, whereby the combustion pressure acting on the upper cylinder heads is transmitted through the cylinder base without exposing the cylinder base to tension, piston rods passing respectively through the said central openings of the lower cylinder heads, pistons in said respective cylinders each provided with an upper and a lower piston head cooperating pairs of which being attached respectively to said piston rods, conduit means supported by said cylinder base on the cylinder base side opposite the framework and surrounding the cylinders and providing passages for scavenging air to the said scavenging air ports and for exhaust from said exhaust ports and being unaffected by the combustion forces transmitted by the said tension means attaching the upper cylinder zones to the cylinder base, said scavenging and exhaust conduit being independent of the cylinders and of said cylinder cooling means and permitting the removal of the cylinders from the cylinder base without dismantling the said conduit means.

19. In an internal combustion engine the combination of, a lower structural framework of the cross head type, a cylinder base supported by said framework and attached thereto by tension members and provided with a plurality of bores having shoulders adapted to support power cylinders respectively one in each bore, a plurality of power cylinders each comprising an upper zone, an intermediate zone and a lower zone, said upper zone being provided with cooling means and having a cylinder head integral with a part of the cylinder and containing a part of the cylinder bore and with a shoulder placed as closely to the intermediate ported zone of the cylinder as considerations of strength will permit providing thereby for the attachment of the cylinder to the cylinder base, said intermediate zone being provided with ports for scavenging air and exhaust gas, said lower zone being provided with cooling means and having a cylinder head integral with a part of the cylinder and containing a part of the cylinder bore and being provided with a central opening in said head adapted for the passage therethrough of a piston rod and having a supporting shoulder located as closely to the intermediate ported part of the cylinders as considerations of strength will permit, said lower cylinder ends being provided respectively with cylinder flanges adapted to guide extreme lower ends of said cylinders in the respective cylinder base bores, said power cylinders being supported by their respective shoulders from the respective shoulders formed in the cylinder base bores and said cylinders passing through the entire depth of said cylinder base in the direction of the cylinder axes and being attached to the said cylinder base by tension means connected to the upper cylinder zone, said tension means for attaching said cylinders to said base comprising clamping rings in respective engagement with said shoulders formed on the respective upper cylinder zones and bolts extending through said rings and said cylinder base, piston rods passing respectively through the said central openings of the lower cylinder heads, pistons in said respective cylinders each provided with an upper and a lower piston head cooperating pairs of which being attached respectively to said piston rods, conduit means supported by said cylinder base on the cylinder base side opposite the framework and surrounding the cylinders and providing passages for scavenging air to the said scavenging air ports and for exhaust from said exhaust ports and being unaffected by the combustion forces transmitted by the said tension means attaching the upper cylinder zones to the cylinder base, said scavenging and exhaust conduit being independent of the cylinders and of said cylinder cooling means and permitting the removal of the cylinders from the cylinder base without dismantling the said conduit means.

20. In an internal combustion engine of the double acting type the combination of, a lower framework, a cylinder base resting on said framework and attached thereto by tension members and provided with a bore having a shoulder projecting into the bore and adapted to support a power cylinder, a power cylinder comprising three zones, an upper zone, an intermediate zone located above the cylinder base and a lower zone extending into the cylinder base and provided with a cylinder head having a central opening adapted to permit the passage therethrough of a piston rod, said piston rod, a piston provided with upper and lower piston heads attached to said piston rod, conduit means for scavenging air and exhaust gas, the said power cylinder comprising three separate parts corresponding to the three zones, the said lower cylinder part consisting of a dome shaped cylinder head provided with an inserted liner and extended upwards to provide a flange whose under side forms a shoulder for supporting the cylinder on the cooperating shoulder projecting into the cylinder base bore, said shoulder on the cylinder being located as closely to the extreme upper end of said part as considerations of strength will permit, the intermediate cylinder part consisting of a cylindrical liner provided with ports for scavenging air and exhaust gas and resting on the lower cylinder part and supporting on its upper end the upper cylinder part, the upper cylinder part consisting of a dome shaped cylinder head provided with an inserted liner and extending downwards to a flange the upper side of which forms a shoulder located as closely to the extreme lower end of said upper cylinder part as considerations of strength will permit, a clamping ring in clamping attachment with the shoulder of said upper cylinder part and surrounding said cylinder, an attachment means cooperating with said ring to attach said upper cylinder part to said cylinder base, whereby the cylinder ends from the respective supporting shoulders to their ends can expand unhindered by their attachment to said cylinder base and whereby the intermediate cylinder part is held rigidly between the upper and lower cylinder parts through which a continuous cylinder bore is formed and continuous liquid cooling passages being formed through the said flange of the lower cylinder part and the said liner of the intermediate cylinder part and the said flange of the upper cylinder part, whereby the expansion of that part of the said cylinder which is rigidly held between the said upper shoulder and the said lower shoulder is minimized by the cooling liquid.

In testimony whereof I have signed my name to this specification.

OLAV E. JORGENSEN.